2,871,222
Patented Jan. 27, 1959

2,871,222

CATALYSTS FOR GLYCIDYL POLYETHERS AND PRODUCTS PRODUCED THEREBY

Arnold B. Finestone, Pittsburgh, Pa., assignor to Westinghouse Electric Corporation, East Pittsburgh, Pa., a corporation of Pennsylvania No Drawing. Application April 18, 1957
Serial No. 653,514

7 Claims. (Cl. 260—47)

The present invention relates to a process for curing glycidyl polyethers to form hardened resins particularly well adapted for use as electrical insulation, and to the products produced thereby.

Glycidyl polyethers, also known as epoxy resins, have excellent chemical resistance, low moisture permeability and superior adhesive properties all of which make said resins particularly well suited for use as adhesive sealing compounds, casting resins and surface coatings. Generally, glycidyl polyethers have been cured to hard resins by heating the same in the presence of catalytic amounts of an amine or an acid anhydride. Numerous disadvantages have resulted from such prior art curing practices.

The amine type catalysts, such as diethylenetriamine and dimethylamine, are extremely fast acting catalysts when used in association with glycidyl polyethers. As a result, such resins must be used almost immediately after the catalyst has been admixed therewith. Any unused catalyzed resinous mixture must be discarded to prevent the same from hardening within the mixing container. Furthermore, many of the amines which have been used heretofore are toxic, certain of them have quite unpleasant odors, and are quite volatile.

Of the acid anhydride materials which may be used, maleic anhydride and phthalic anhydride have enjoyed the most widespread acceptance as curing catalysts for epoxy resins. Like the amine catalysts, however, the acid anhydrides when admixed with epoxy resins provide liquid mixtures having a relatively short shelf life. A further disadvantage of acid anhydride catalysts lies in the fact that they must be admixed with the resins at elevated temperatures to insure complete solution therein. On subsequent cooling, however, precipitation of the catalytic material frequently occurs.

In U. S. Patent No. 2,809,184, which patent is assigned to the assignee of the present invention, certain compositions are disclosed and claimed which are suitable for use in curing glycidyl polyethers to solid products. The compositions therein disclosed comprise mixtures of critical amounts of certain borate esters and critical amounts of certain trialkylolamine-titanate esters. The said compositions are superior to amines and acid anhydrides in their ability to effect satisfactory cures of glycidyl polyethers.

It now has been discovered that mixtures of certain new classes of compounds provide curing compositions which are superior in their action even to those described in the above-identified U. S. Patent No. 2,809,184.

The object of the present invention is to provide mixtures of glycidyl polyethers and curing catalysts comprising at least one boronate ester and at least one dialkylolamine-titanate complex which mixtures are stable for prolonged periods of time at room temperature and will react readily at elevated temperatures to provide cured resinous products.

Another object of this invention is to provide a process for curing glycidyl polyethers by heating the same at elevated temperatures in the presence of a curing catalyst comprising at least one boronate ester and at least one dialkylolamine-titanium chelated ester complex.

A still further object of this invention is to provide electrical members insulated with a resinous composition comprising the reaction product of a glycidyl polyether, at least one boronate ester, and at least one dialkylolamine-titanate ester.

Other and further objects of the invention will, in part, be obvious and will, in part, appear hereinafter.

Broadly, the foregoing objects are attained in accordance with the present invention by mixing reactive glycidyl polyethers with a curing catalytic composition comprising at least one boronate ester and at least one dialkylolamine-titanate ester. The mixture is highly stable at room temperatures, yet will cure rapidly at temperatures within the range of from 100° C. to 200° C. The resinous products thus obtained are hard and tough and have electrical properties superior even to those of resins cured using the compositions disclosed in the above-identified patent application.

More specifically, this invention provides a process which comprises admixing a glycidyl polyether with (a) from 2% to 20% by weight, based on the weight of the glycidyl polyether, of at least one boronate ester having the formula

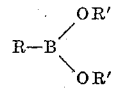

wherein R and R' are radicals selected from the group consisting of aliphatic, aromatic, and cyclic groups, and (b) from 2% to 15% by weight, based on the weight of the glycidyl polyether, of at least one dialkylolamine-titanate ester having the formula

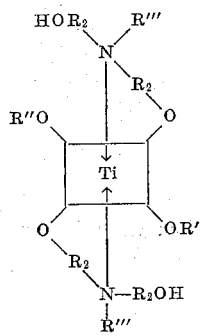

wherein $R_2$ is a bivalent alkylene radical and R', R", and R''' are monovalent radicals selected from the group consisting of hydrogen, aliphatic and aromatic groups, and heating the mixture at temperatures within the range of from about 90° C. to about 200° C. or slightly higher to produce a hard, cured resinous product.

It is desirable to combine sufficient of the boronate ester to provide about one mol of boron therefrom per mol of nitrogen in the dialkylolamine-titanate ester. However, these proportions may be departed from. Good curing has been secured when the ratio of dialkylolamine-titanate ester to boronate ester is of the order of about 4:1. A substantial excess of boronate ester ordinarily need not be employed because it does not produce any proportional benefit.

Mixtures of glycidyl polyethers in combination with the mixture of curing agents of this invention have extremely long shelf life at room temperatures. That is, they do not gel even after several months storage at room temperature (20–30° C.) yet will cure to the solid state after only a few hours heating at 135° C. or after having been heated to a temperature of 200° C. for a period of about one hour.

A further advantage of this invention resides in the fact that the curing catalyst comprising a boronate ester and a dialkylolamine-titanate ester is a liquid which is easy to dissolve in the glycidyl polyether. In many cases, the curing catalyst mixture, since it is a liquid, helps reduce the viscosity of the glycidyl polyethers thereby permitting more complete penetration and impregnation of electrical apparatus to which the mixtures may be applied.

The boronate esters forming a portion of the curing catalyst of this invention are well known in the art and include those materials having the following structural formula:

(I) 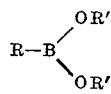

where R and R' may be an aliphatic radical including, for example, methyl, ethyl propyl, isobutyl, isopropyl, butyl, and isobutyl; a cyclic group including, for example, cyclohexyl; or an aromatic group including, for example, benzyl, phenyl and methyl-phenyl. A mixture of two or three different radicals may be present in a single boronate ester.

The dialkylolamine-titanium ester complex portion of the curing catalyst employed in accordance with this invention is a chelating agent represented by the following structural formula:

(II) 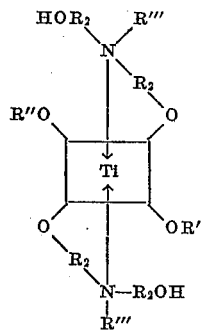

wherein $R_2$ is a bivalent alkylene radical and R', R'', and R''' are monovalent aliphatic groups including, for example, hydrogen, methyl, ethyl, propyl, isobutyl, isopropyl, butyl and isobutyl; a cyclic group including, for example, cyclohexyl; or an aromatic group including, for example, benzyl, phenyl and methyl-phenyl. These chelated titanium esters are not distillable nor are they crystallizable. They will contain a molar ratio of dialkylolamine to titanium within the range of substantially 2:1. They may be prepared by reacting one mol of a titanium ester with two mols of a dialkylolamine and distilling off two mols of the lower boiling alcohol derived from the titanium ester. As a specific example of the preparation of a chelating ester which has been found to be particularly suitable for use in accordance with this invention the following is given: One mol of tetraisopropyl titanate is reacted with two mols of diethanolamine with two mols of isopropyl alcohol being distilled off. The two remaining isopropyl groups represented by R' and R'' in Formula II above then may be further reacted with higher boiling alcohols to replace one or two of the isopropyl groups with a higher alkyl or an aryl group. The diethanolamine titanate esters have given outstanding results.

In preparing the resinous compositions of this invention according to one preferred procedure, there is employed, a resinous polymeric epoxide or glycidyl polyether. Such epoxides or glycidyl polyethers may be obtained by reacting predetermined amounts of at least one polyhydric phenol or polyhydric alcohol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such for example as 4,4'-dihydroxy-diphenyl-dimethyl-methane (referred to hereinafter as bis-phenol "A"), 4,4'-dihydroxy-diphenyl-methyl methane and 4,4'-dihydroxy-diphenyl-methane. In admixture with the named polynuclear phenols, use also may be made of those polynuclear phenols wherein the phenol nuclei are joined by sulfur bridges, such for example as 4,4'-dihydroxy-diphenyl-sulfone. Examples of suitable polyhydric alcohols are glycerol, propylene glycol and 1,5-pentanediol.

While it is preferred to use epichlorohydrin as the epihalohydrin in the preparation of the resinous polymeric epoxide starting materials of the present invention, homologues thereof, for example, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The product of the reaction, instead of being a single simple compound, is generally a complex mixture of glycidyl polyethers, but the principal product may be represented by the formula:

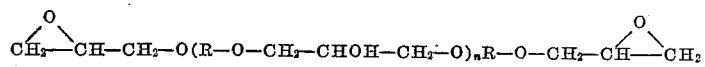

where $n$ is an integer of the series 0, 1, 2, 3 . . . , and R represents the divalent hydrocarbon radical of the dihydric phenol. While for any single molecule of the polyether $n$ is an integer, the fact that the obtained polyether is a mixture of compounds causes the determined value for $n$, from molecular weight measurement, to be an average which is not necessarily zero or a whole number. Although the polyether is a substance primarily of the above formula, it may contain some material with one or both of the terminal glycidyl radicals in hydrated form.

The simplest polyether is a diglycidyl diether of the dihydric phenol which contains a single divalent aromatic hydrocarbon radical from the dihydric phenol and has two glycidyl radicals linked thereto by etheral oxygen atoms. More generally, the polyether is of more complex character and contains two or more aromatic hydrocarbon radicals alternating with glyceryl groups in a chain which glycidyl radicals linked thereto by etheral oxygen atoms.

The resinous polymeric epoxide, or glycidyl polyether of a dihydric phenol suitable for use in this invention, has a 1,2-epoxy equivalency greater than 1.0. By epoxy equivalency reference is made to the average number of 1,2-epoxy groups.

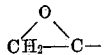

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers is thus a value between 1.0 and 2.0.

The 1,2 epoxide value of the glycidyl polyether is determined by heating a weighed sample of the ether with an excess of 0.2 N pyridinium chloride in chloroform solution at the boiling point under reflux for 2 hours whereby the pyridinium chloride hydrochlorinates the epoxy groups to chlorohydrin groups. After cooling, the excess pyridinium chloride is back-titrated with 0.1 N sodium hydroxide in methanol to the phenolphthalein end point.

Resinous polymeric epoxides or glycidyl polyethers suitable for use in accordance with this invention may be prepared by admixing and reacting from one to two mol proportions of epihalohydrin, preferably epichlorohydrin, with about one mol proportion of bis-phenol "A" in the presence of at least a stoichiometric excess of alkali based on the amount of halogen.

To prepare the resinous polymeric epoxides, aqueous alkali, bis-phenol "A" and epichlorohydrin are introduced into and admixed in a reaction vessel. The aqueous alkali serves to dissolve the bis-phenol "A" with the formation of the alkali salts thereof. If desired, the aqueous alkali and bis-phenol "A" may be admixed and the epichlorohydrin added thereto, or an aqueous solution of alkali and bis-phenol "A" may be added to the epichlorohydrin. In any case, the mixture is heated in the vessel to a temperature within the range of about 80° to 110° C. for a period of time varying from about one-half hour to three hours, or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali.

The boronate ester and dialkylolamine-titanate ester will dissolve readily in the glycidyl polyethers and form homogeneous compositions. The resultant solution is liquid and may be stored for several months at room temperature without any appreciable increase in viscosity. It is a particularly important feature of this invention, however, that when the catalyzed polyether mixture is subjected to elevated temperatures of from 90° C. to 200° C. and higher, the liquid polyether-catalyst mixture readily reacts to form hard, tough, cured resinous products. Such products exhibit low electrical losses over substantially all temperatures at which apparatus containing such products may operate.

Glycidyl polyethers catalyzed with the curing catalyst mixture of this invention are particularly suitable for electrical insulating applications. Thus, solutions of the glycidyl polyethers and curing catalysts may be applied to electrical wires, cables, coils, windings and the like as potting, impregnating and coating resins and varnishes. Upon being subjected to heat, any solvent which may be present in the polyether-curing catalyst mixture evaporates and the liquid polyether cures to a hard, tough resinous mass. These catalyzed glycidyl polyether compositions also may be employed for potting and casting applications. Laminated magnetic cores, for example, may be dipped in such liquid compositions, using vacuum and pressure if necessary, and the composition will readily fill all of the spaces between laminations. On heating, the composition between the laminations cures to a hard, tough, adhesive binder holding the laminations in position to produce a solid core which is extremely resistant to delamination and may be cut into core segments without rupture. Electrical transformers, rectifiers and electronic components of various kinds may be potted or cast within the completely reactive catalyzed glycidyl polyether compositions of this invention.

The compositions comprising the epoxy resin, and the boronate ester and dialkylolamine-titanate esters are excellent adhesives. Thin coatings may be applied to metal, wood, porcelain, paper, plastics such as phenolic laminates, and when the coated surfaces are superimposed under moderate pressures and heated to temperatures of 90° C. to 200° C. usually good bonds are obtained. Steel plates cemented with these compositions and cured at 150° C. for two hours required 17,000 pounds on an area of 5.25 square inches in shear to rupture the bond.

Glycidyl polyethers which are cured using the catalytic mixtures of this invention may be admixed with solids such as silica, hydrated alumina, titanium dioxide, glass fibers, wood flour, mica, graphite and calcium silicate. In some instances small amounts up to 50% of the weight of the composition of other resins, such as phenolics, polyesters such as glycol maleates, and alkyd resins, may be admixed with the glycidyl polyethers in the practice of the present invention.

In order to indicate even more specifically the advantages and capabilities of the curing catalytic mixture of the present invention, the following specific examples are set forth. The parts given are by weight unless otherwise indicated.

*Example I*

A glycidyl polyether is prepared by introducing into a reaction vessel equipped with agitator, cooling and heating means, distillation condenser and receiver, 513 parts (2.25 mols) of bis-phenol [2,2-bis(4-hydroxylphenyl)propane] and 208.1 parts (2.25 mols) of epichlorohydrin and 10.4 parts of water. A total of 188 parts of 97.5% sodium hydroxide, corresponding to 2.04 mols (2% excess) per mol of epichlorohydrin, is added in increments over several hours. The temperature in the vessel does not rise above 100° C. and is generally not above 95° C. After all the sodium hydroxide is added, the excess water and epichlorohydrin is removed by evacuating to an absolute pressure of 50 mm. of mercury at 150° C. The vessel is then cooled to 90° C. and 36 parts of benzene added, and then cooled further to 40° C. with salt precipitating from the solution. The solution is filtered to remove the salt, the salt being washed with 36 additional parts of benzene, the benzene washing out any polyether resin and then being added to the filtrate and both returned to the vessel. The benzene is then distilled off, the polyether resin being heated at an increasing temperature until at 125° C. vacuum is applied and distillation is continued until the vessel contents are at 170° C. at 25 mm. of mercury absolute pressure. The glycidyl polyether had a viscosity of Z-3 on the Gardner-Holdt scale.

*Example II*

To 100 parts of the glycidyl polyether prepared as described in Example I, there are added 5.2 parts of n-propyl phenylboronate and 5.2 parts of diisopropyl bis-N-methyldiethanolamine titanate with continuous stirring. The mixture had a viscosity of Z-1 on the Gardner-Holdt scale. On standing the catalyzed resin mixture increased in viscosity to Z-3 on the Gardner-Holdt scale after one month and to a viscosity of Z-5 after another month's standing. A mixture of the glycidyl polyether and n-propyl phenylboronate and titanium catalyst gelled in less than ½ hour when heated to 200° C. and in less than ¾ of an hour when heated to a temperature of 135° C. All samples attained a Shore hardness of at least 85 on the D scale within three hours after gelling. After further curing at 135° C. for 24 hours the resin had the following electrical properties:

| Test Temp., ° C. | Power Factor 100 × tan | | Dielect. Const. | |
|---|---|---|---|---|
| | 60 Cy. | 1 Kcy. | 60 Cy. | 1 Kcy. |
| 25 | 0.44 | 0.44 | 3.33 | 3.33 |
| 100 | 0.56 | 0.62 | 3.65 | 3.62 |
| 150 | 6.96 | 2.32 | 4.24 | 4.01 |

Glycidyl polyethers can be cured about six times as fast using the catalyst composition of this invention than when using the compositions of the copending application referred to above. Moreover, the cured resin has much better power factor properties than does resin cured with the composition of the copending application.

*Example III*

A solution was made up as described in Example I using 100 parts of the glycidyl polyether, 5.2 parts of n-propyl phenylboronate and 4.6 parts of diisopropyl bis-diethanolamine titanate. After the addition of the catalyst the resin mixture had a viscosity of Z–6 of the Gardner-Holdt scale. The catalyzed resin attained a viscosity, on standing for a month, of Z–6 on the Gardner-Holdt scale. The resin gelled in one hour when heated to 200° C. and in two hours when heated to 135° C. Both resin samples had a Shore hardness of 85 on the D scale within three hours after gellation.

*Example IV*

A transformer is impregnated with a quantity of the catalyzed glycidyl polyether mixture prepared as described in Example I. Prior to introduction into the glycidyl polyether, the catalytic mixture is heated at a temperature of from 130 to 185° C. until vapors of low boiling isopropyl alcohol stop coming off. This obviates the possibility of bubbles forming subsequently in the transformer during impregnation and baking. The heat-treated catalytic mixture then is admixed with the glycidyl polyether and the composition is applied to the transformer in an impregnation tank under pressure. After curing at a temperature of 135° C. for about three hours, and three hours at 120° C. the transformer is completely impregnated with a tough, hard resin having excellent electrical insulating properties.

While the present invention has been described with reference to particular embodiments thereof, it will be understood, of course, that certain changes, modifications and substitutions may be made therein without departing from its scope.

I claim as my invention:

1. A composition of matter comprising (1) a reactive resinous glycidyl polyether derived from a dihydric phenol and an epihalohydrin, said polyether having an epoxy equivalency of greater than 1, and (2) a curing catalyst therefor comprising a mixture of (a) from 2% to 20% by weight, based on the weight of the polyether, of a least one boronate ester having the the formula

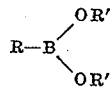

wherein R and R' are selected from the group consisting of methyl, ethyl, propyl, isobutyl, isopropyl, butyl, isobutyl, cyclohexyl, benzyl, phenyl, and methyl-phenyl groups, and (b) from 2% to 15% by weight, based on the weight of the polyether, of at least one dialkylolamine-titanate ester having the formula

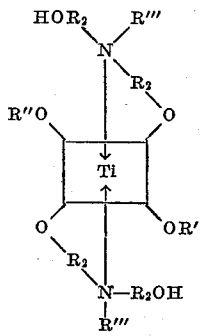

wherein $R_2$ is a bivalent alkylene radical and R', R'', and R''' are materials selected from the group consisting of hydrogen, methyl, ethyl, propyl, isobutyl, isopropyl, butyl, isobutyl, cyclohexyl, benzyl, phenyl, and methyl-phenyl groups.

2. A composition of matter comprising a reactive resinous glycidyl polyether of a dihydric phenol and an epihalohydrin, said polyether having a 1,2-epoxy equivalency of greater than 1, having admixed therewith about 2% to 25% by weight, based on the weight of the polyether, of at least one boronate ester having the formula

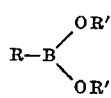

wherein R and R' are selected from the group consisting of methyl, ethyl, propyl, isobutyl, isopropyl, butyl, isobutyl, cyclohexyl, benzyl, phenyl, and methyl-phenyl groups, and from 2% to 25% by weight, based on the weight of the polyether, of at least one diethanolamine-titanate ester having the formula

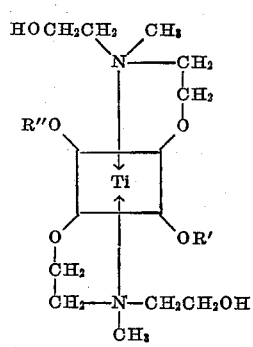

wherein R' and R'' are selected from the group consisting of hydrogen, methyl, ethyl, propyl, isobutyl, isopropyl, butyl, isobutyl, cyclohexyl, benzyl, phenyl, and methyl-phenyl groups.

3. The process of producing a resinous product which comprises admixing a resinous glycidyl polyether of a dihydric phenol and an epihalohydrin with from 2% to 25% by weight, based on the weight of the polyether, of at least one boronate ester having the formula

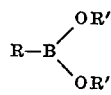

wherein R and R' are selected from the group consisting of methyl, ethyl, propyl, isobutyl, isopropyl, butyl, isobutyl, cyclohexyl, benzyl, phenyl, and methyl-phenyl groups, and from 2% to 25% by weight, based on the weight of the polyether, of at least one diethanolamine-titanate ester having the formula

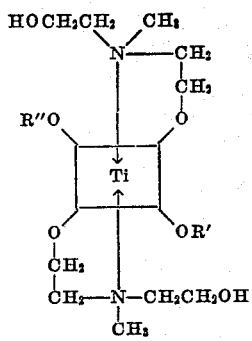

wherein R' and R'' are selected from the group consisting of hydrogen, methyl, ethyl, propyl, isobutyl, isopropyl, butyl, isobutyl, cyclohexyl, benzyl, phenyl, and methyl-phenyl groups, and heating the mixture at temperatures within the range of from about 90° C. to about 200° C. to produce a hard, cured resinous product.

4. The process of claim 3 wherein the glycidyl polyether is the product obtained by reacting 2,2-bis (4-hydroxyphenyl) propane and epichlorohydrin in an alkaline medium.

5. The cured, resinous product produced by the process of claim 3.

6. An insulated electrical member comprising an electrical conductor and cured, resinous insulation applied to the conductor, the resinous insulation comprising the reaction production of a resinous glycidyl polyether of a dihydric phenol and an epihalohydrin, said polyether having a 1,2-epoxy equivalency greater than 1, and from 2% to 25% by weight, based on the weight of the polyether, of at least one boronate ester having the formula

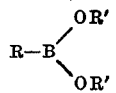

wherein R and R' are selected from the group consisting of methyl, ethyl, propyl, isobutyl, isopropyl, butyl, isobutyl, cyclohexyl, benzyl, phenyl, and methyl-phenyl groups, and from 2% to 25% by weight, based on the weight of the polyether, of at least one diethanolamine-titanate ester having the formula

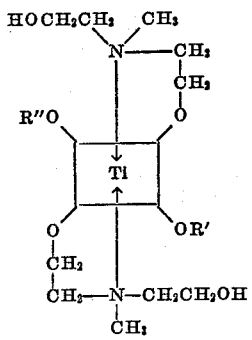

wherein R' and R'' are selected from the group consisting of hydrogen, methyl, ethyl, propyl, isobutyl, isopropyl, butyl, isobutyl, cyclohexyl, benzyl, phenyl, and methyl-phenyl groups.

7. An insulated electrical member as set forth in claim 6 wherein the resinous insulation contains finely divided inorganic filler material.

No references cited.